P. STRAGIOTTI.
TELEPHONIC TRANSMITTER.
APPLICATION FILED AUG. 11, 1909.

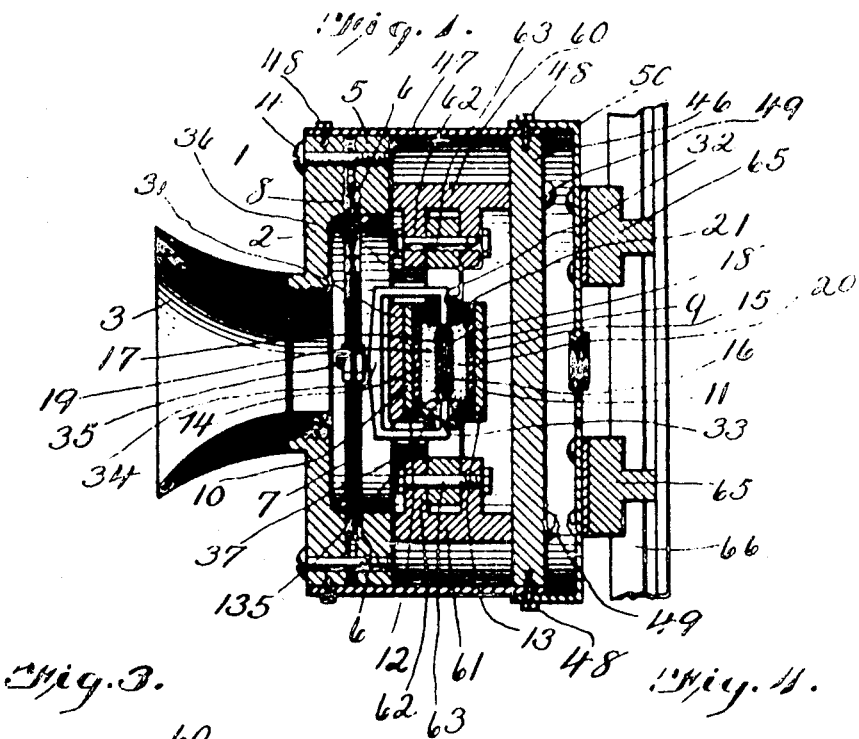

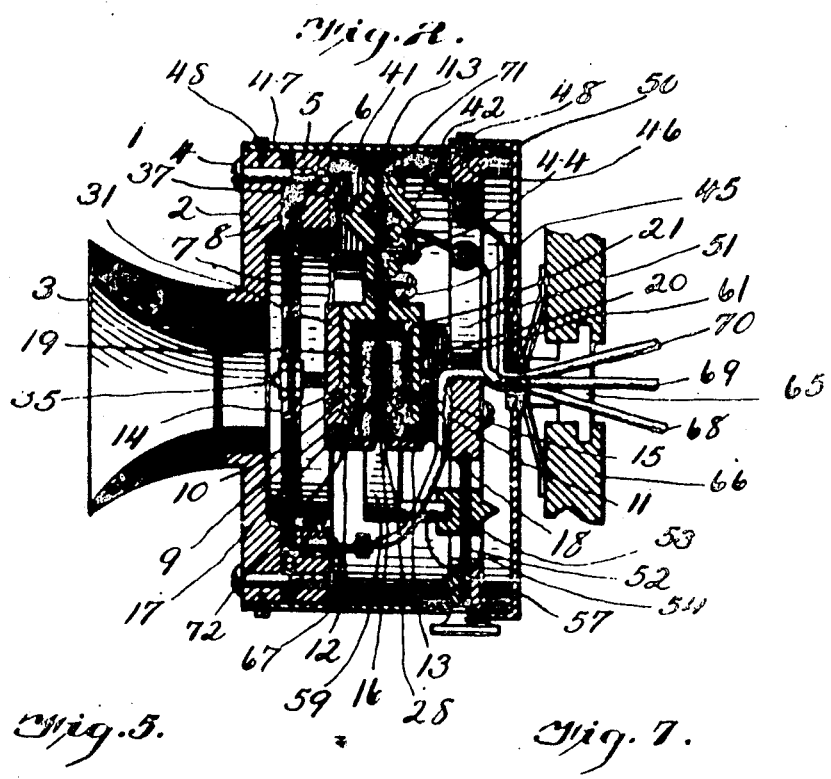

955,716.

Patented Apr. 19, 1910.
4 SHEETS—SHEET 3.

Witnesses
Inventor
Pietro Stragiotti
Attorney

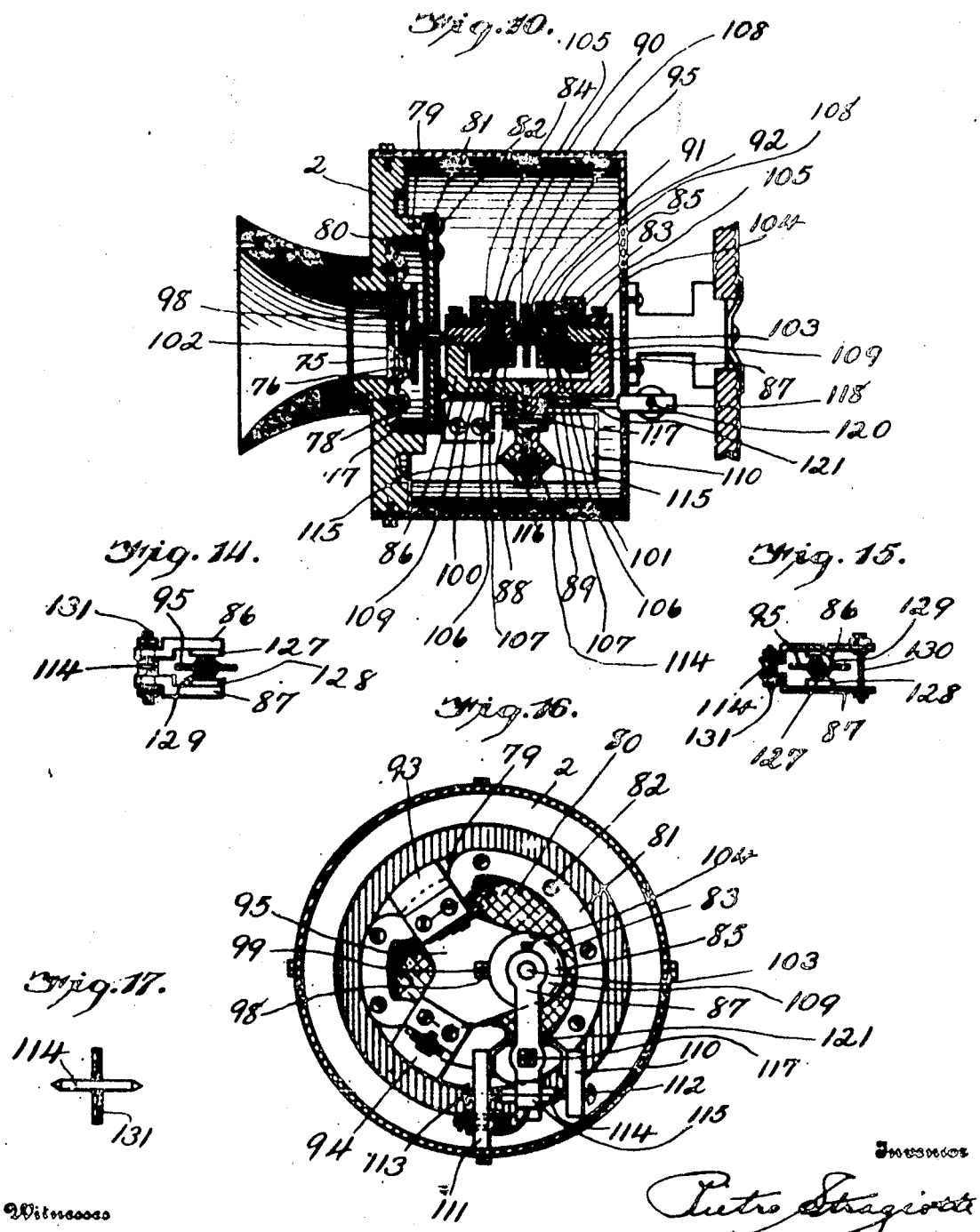

UNITED STATES PATENT OFFICE.

PIETRO STRAGIOTTI, OF HURLEY, WISCONSIN.

TELEPHONIC TRANSMITTER.

955,716.  Specification of Letters Patent.  Patented Apr. 19, 1910.

Application filed August 11, 1908. Serial No. 448,026.

*To all whom it may concern:*

Be it known that I, PIETRO STRAGIOTTI, subject of the King of Italy, residing at Hurley, in the county of Iron and State of Wisconsin, have invented certain new and useful Improvements in Telephonic Transmitters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to the class of telephony, but more particularly to a differential telephonic transmitter; and my invention consists in the construction of the differential micro-phone arranged so that equality of pressure is obtained in its two parts.

My invention further consists in constructing the whole apparatus in such manner that it may turn around an axis, so that no strain may initially act on the central electrode.

My invention further consists in arranging a disk or diaphragm of felt in front of the micro-phone to prevent troubling interferences through the air.

My invention further consists in the construction of the micro-phone, and in the way of arranging its several elements in such manner that the diaphragm of the micro-phone is more elastic than the usual elastic diaphragm.

My invention further consists in the construction of the micro-phone, which not only allows its rotation around the axis to prevent all initial strain on the central electrode of the micro-phone, but also allows the micro-phone to oscillate synchronically with the central electrode.

My invention further consists in certain other novel details of construction and in combinations of parts, all of which will be first fully described and afterward specifically pointed out in the appended claims.

Figure 9:
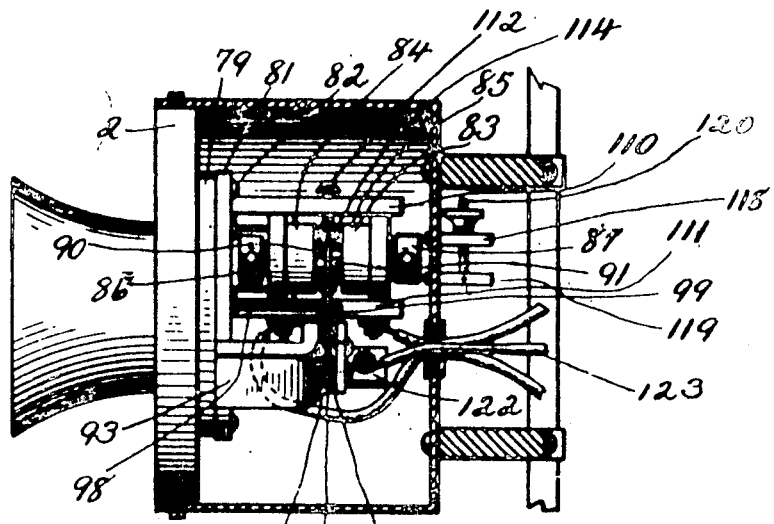
Figure 11:
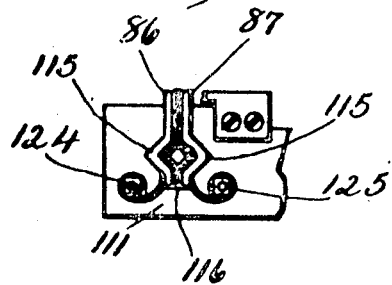
Figure 12:
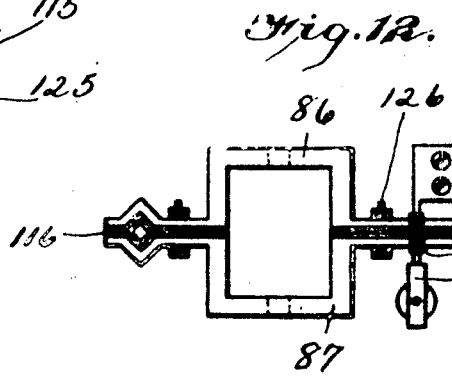
Figure 13:
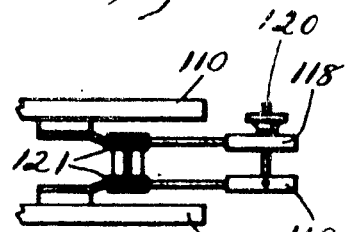

Referring to the accompanying drawings: Figure 1 is a vertical sectional view through the transmitter. Fig. 2 is a horizontal sectional view through the transmitter. Fig. 3 is an elevation looking forward, the back plate being removed. Fig. 4 is an elevation of the back plate. Fig. 5 is an elevation of one of the supporting arms or plates. Fig. 6 is a top plan of the two supporting arms or plates and casing for the micro-phones. Fig. 7 is an edge view of the casing of the micro-phones. Fig. 8 is a perspective view of the insulating ring within the casing, and of the micro-phones. Fig. 9 is an elevation of the transmitter showing a slight modification. Fig. 10 is a horizontal section through the same. Fig. 11 is a fragmentary view of a part of the supporting arms or plates of the micro-phone and the axis therefor. Fig. 12 is a plan view of a slight modification of the supporting arms or plates for the micro-phones. Fig. 13 is an elevation of the springs holding the supporting arms or plates of the micro-phones. Fig. 14 is a plan of a slight modification of the micro-phones. Fig. 15 illustrates a slight modification of the supporting arms or plates of the micro-phones. Fig. 16 is a rear elevation of the transmitter illustrated in Fig. 9. Fig. 17 is a detail view of the axis of the supporting arms of the micro-phone as applied to Figs. 14 and 15.

Like numerals of reference indicate the same parts throughout the several figures in which;

1 indicates the differential telephonic transmitter which comprises a frontal plate 2 to which is secured the usual mouth piece 3. Connected to the frontal plate 2 by means of screws 4 is a ring 5, said ring being provided with an annular off-set 6 between which off-set 6 and the frontal plate 2 the diaphragm 7 is held. Surrounding the diaphragm 7 is a U-shaped insulating ring 8.

9 indicates the differential micro-phone which comprises a micro-phone 10 and a micro-phone 11.

12 and 13 indicate the supporting arms or plates of the two micro-phones 10 and 11. the supporting arm or plate 12 being provided with a small plate of very hard and well smoothed carbon 14, while the supporting arm or plate 13 is provided with a similar plate 15.

16 indicates the central plate of the differential micro-phone, said plate being of metal and being covered on both sides with sheets of smooth carbon 17 and 18, layers of powdered carbon 19 and 20 being interposed between the carbon plates as clearly shown in Figs. 1 and 2.

Referring now to Fig. 2 and in this connection to Fig. 8 it will be seen that within the supporting arms or plates 12 and 13 of the micro-phones is arranged an insulating ring 21, said insulating ring being made of two parts 22 and 23 which meet at the points 24 and 25. Portions of the ring 21 are cut away at 26 and 27 leaving a narrow strip 28 as shown in Figs. 2 and 8. Two openings or perforations 29 and 30 are provided in the ring 21, said openings or perforations occurring at the breaks 24 and 25 in the ring 21 as clearly shown in Fig. 8.

Referring to Figs. 1 and 2 it will be seen that the supporting arm or plate 12 is covered with a layer of soft tissue 31 for the purpose of extinguishing the sound waves which might disturb the micro-phones or cause them to act with less exactness.

Referring now to Fig. 1 it will be seen that two stems 32 and 33 pass through the perforations 29 and 30 in the insulating ring 21, said stems being connected to the central plate 16 of the micro-phones; and it will also be seen that the stems 32 and 33 meet at the point 34 where they form a stem 35, said stem passing through and being connected to the diaphragm 7 as clearly shown in Figs. 1 and 2.

Referring now to Fig. 3 it will be seen that two supports 36 and 37 are carried on the ring 5, which ring is secured to the frontal plate 2, and two screws 38 and 39 are carried in said supports 36 and 37, the ends of said screws 38 and 39 being concaved in order to receive the pivot or axis 40. Said pivot or axis 40 is preferably square in cross section as shown in Fig. 2, sharp pointed at its ends while the supporting arms or plates 12 and 13 of the micro-phones are formed with elbows 41 and 42 to embrace the said pivot or axis 40 as clearly shown in Fig. 2, said pivot or axis 40 and the two supporting arms or plates 12 and 13 being insulated from each other by means of suitable insulating material 43 as shown in Fig. 2. Securing the two arms or plates 11 and 12 together are two screws 44 and 45, said screws forming an electrical connection with the supporting arm or plate 12 and being insulated from the supporting arm or plate 13 by suitable insulating material as clearly shown in Fig. 2. 46 indicates the rear plate of the transmitter which, as shown in Figs. 1 and 2, is held in position by means of the four screws 49. The casing or cover 47 is secured to the frontal plate 2 and to the rear plate 46 by means of suitable screws 48, the rear metallic cap or cover 50 for the transmitter passing over the rear edge of the casing 47 and being secured thereto and to the rear plate 46 by means of suitable screws 48.

Referring now to Fig. 4 which illustrates the rear plate 46 in elevation it will be seen that the same is provided with an oblong opening 51 through which the wires of the transmitter pass. A suitable adjusting screw 52 is also carried in said plate 46, said screw entering a nut 53, said nut operating within the slot 54 formed in the plate 46. A groove 55 is formed in said nut 53, said groove being for the purpose of receiving the stems 56 and 57 of the adjusting arms 58 and 59 (Fig. 3).

Referring now to Figs. 1 and 3 it will be seen that two supporting pieces 60 and 61 pass from the ring 5 to the rear plate 46, each of said pieces being provided with a yoke 62, within which yokes the adjusting arms 58 and 59 are pivoted by means of bolts 63. The said adjusting arms 58 and 59 as will appear from Fig. 3 are provided on their free ends with a layer of soft insulating material 64, said free ends of the adjusting arms 58 and 59 engaging the supporting arms or plates 12 and 13 of the micro-phones as clearly shown in Fig. 3.

Referring now to Figs. 1 and 2 it will be seen that the rear cap or cover 50 of the transmitter is provided with two slides 65 which are adapted to operate within the slide 66 for the purpose of allowing the transmitter to be raised or lowered.

Referring now to Fig. 2 it will be seen that a small arm 67 connects with the diaphragm 7 to which arm a wire 68 is connected. It will also be seen that the supporting arm or plate 12 is connected to the wire 69 through the medium of the screw 44, while the supporting arm or plate 13 is connected to the wire 70 at the point 71.

Referring now to the Figs. 6, 7 and 8 it will be seen that a cover or retaining piece 72 is secured to the end of the supporting arms or plates 12 and 13, said cover or retaining piece 72 being for the purpose of retaining the powdered carbon within the micro-phones as well as to keep the ring 21 in place.

Referring now to Figs. 9, 10 and 16 which illustrate a slight modification of the transmitter, it will be seen that a small metal disk 75 is provided within the frontal plate 2, said disk 75 having a rim or flange 76 secured to the edge of said disk, said rim or flange 76 being concaved as clearly shown in Fig. 10, said rim or flange being secured to a metal ring 77 and insulated from the frontal plate 2 by means of a strip of insulating material 78.

As shown in Fig. 10 a flange 79 is formed on the inner surface of the frontal plate 2, said flange 79 carrying a disk of soft felt tissue 80, said disk being bound by a U-shaped rim 81 which is fixed to the flange 79 by means of suitable screws 82. 83 indicates the differential micro-phone which comprises a micro-phone 84 and micro-phone 85; and as shown in Fig. 10 two supporting arms 86 and 87 are provided for holding the micro-phones. The differential micro-phone comprises two central electrodes 88 and 89, each of which is provided with a stem 90 and 91, a screw 92 entering the stems 90 and 91 as shown in Fig. 10 for holding the same firmly in position.

Referring now to Figs. 9 and 10 it will be seen that two supporting arms 93 and 94 carried on the frontal plate 2 support a steel plate 95, said plate 95 being insulated from the supporting arms 93 and 94 by means of insulating strips 96 and 97. As shown in Fig. 9 a stem 98 connected to the disk 75 passes through the felt disk 80 and is connected to the thin steel plate 95 at the point 99 (Fig. 16); and referring to Figs. 9, 10 and 16 it will be seen that the screw 92 which connects the stems of the central electrodes 88 and 89 pass through the said steel plate 95, the said stems of the said electrodes firmly engaging said plate as clearly shown in Fig. 10. 100 and 101 indicate the outer electrodes of the two micro-phones, said electrodes 100 and 101 being provided with stems 102 and 103, said stems entering the supporting arms 86 and 87 and secured therein by means of screws 104. The central electrodes 88 and 89 and the outer electrodes 100 and 101 are covered with plates of smooth carbon 105, and the intervening spaces between the faces of smooth carbon are filled with granulated carbon 106. Surrounding the electrodes of both micro-phones is insulating material 107, and covering each electrode is a casing 108 and a cap 109, said electrodes being insulated from said casing and cap as clearly shown in Fig. 10.

Referring now to Fig. 11 it will be seen that two supports 110 and 111 provided with screws 112 and 113 carry the axis or pivot 114, which axis or pivot is preferably square in cross section, and as will appear from Fig. 10 the supporting arms 86 and 87 of the micro-phones are provided with elbows 115 to conform to the shape of the axis or pivot 114, said supporting arms being insulated from each other and from the axis or pivot 114 by a strip of insulating material 116. 117 indicates a bolt which passes through the supporting arms 86 and 87 securely insulated therefrom, said bolt being for the purpose of adjusting the said arms and for adjusting the pressure of the electrodes on the granulated carbon within the micro-phones.

As is shown in Figs. 9 and 10 two springs 118 and 119 commanded by an adjusting screw 120 engage the supporting arms 86 and 87 and are insulated therefrom by insulating material 121 as clearly shown in Fig. 10. The plate 95 is provided with an extension 122 to which the electric conductor 123 is connected, and the current from here comes to the two faces of the central electrodes 88 and 89, thence forking, the current passes through each micro-phone 84 and 85 to the points 124 and 125 connected to the supporting arms 86 and 87 as shown in Figs. 9 and 11.

Referring now to Fig. 12, which illustrates a modification of the supporting arms 86 and 87, it will be seen that an adjusting screw 126 is provided in order to regulate the pressure of the carbon within the microphones. In order to give to the transmitter a slightly bent position such as is usually given by the usual support of transmitters, and to secure more stability of the supporting arms 86 and 87 the two springs 118 and 119 which hold the apparatus are in this construction somewhat shorter than in the construction shown in Figs. 9, 10 and 11.

Referring now to Fig. 14 it will be seen that in place of the micro-phones illustrated in Figs. 9 and 10 I may employ the two supporting arms 86 and 87 much smaller, and I provide on the faces of said arms smooth carbon plates 127 and 128, while on the steel plate 95 I secure a sphere of platinum 129.

In the construction illustrated in Fig. 15 I employ the supporting arms 86 and 87 extremely thin and frail and connect the free ends together by means of a bolt 130 which is suitably insulated from the arms.

When employing the construction as shown in Figs. 14 and 15 the form of axis is employed as shown in Fig. 17, the pivot or axis 114 being integral with the screw 131 which passes through the supporting arms 86 and 87.

Having fully described the several parts of my invention its operation is as follows:

In the construction illustrated in Figs. 1 and 2 the whole micro-phone may turn around the axis 40, and if the axis be vertical the whole system is in such a condition that no initial or constructory strain may permanently be found between the small central plate 16 and the balance of the micro-phones. The plate 16 is in this way perfectly free and the two parts of the differential micro-phone will be exactly in the same condition. To better put the two parts of the micro-phone in equal condition and for the exact centering of the small central plate 16 the two peripheries or openings 29 in the insulating ring 21 are of great use, for by this the small central plate 16 may be exactly placed in its proper position, and furthermore the granular carbon may be easily introduced, the opening for the carbon being afterward covered up by the small retaining plates 72 as clearly shown in Fig. 2, and the screw 44 is intended to regulate the pressure of the carbon to obtain the most satisfactory resistance, as the apparatus acts better. When the axis 40 is vertical the slides 65 are provided for maintaining the transmitter in a vertical position. As, however, it is sometimes necessary to move the transmitter about, the two adjusting arms 58 and 59 are provided which are movable about the axes 63, thus keeping the supporting arms of the micro-phone in position, said arms being adjusted in the manner as above described.

The electrical distribution is as follows: The current comes to the diaphragm 7 and is led through the stem 35 to the central electrode 16, and as the micro-phonic case is of insulating material the current goes through the carbon going to the two plates 12 and 13 from which it is led out through the conductors 69 and 70 to the transformers (not shown). The sound waves produced in front of the diaphragm causes it to vibrate, and by the stem 35 the central electrode 16 is caused to vibrate, so that the electric resistance of the two parts of the micro-phone become alternately varying, and consequently the current is alternately varied. To make the vibration of the central electrode 16 possible the stems 32 and 33 which hold it must be in condition to move freely in the holes or openings 29 and 30 in the insulating ring 22, through which holes the said stems pass, and as it is necessary to maintain the granular carbon within the micro-phone two small felt collars 135 are provided as shown in Fig. 1, which collars (while giving a very slight resistance to the vibration) are sufficient to maintain the granular carbon within the micro-phones.

Referring to the construction shown in Figs. 9, 10 and 16, the two arms 86 and 87 being supported on the axis 114 allow the whole system to oscillate, and when the micro-phones are fixed to the plate 95 as shown in Fig. 10 pressure on the granular carbon within the micro-phones is regulated by means of the screw 117 in order to secure the greatest efficiency; as the amount of pressure is dependent upon the screw 117, by which the two external electrodes are adjusted while the exact similarity of pressure in both microphonic chambers is dependent only upon the rotation around the axis 114. The angle of rotation to obtain such similarity will be very small as it is necessary to avoid dis-similarity of strains; however it is none the less a rotation and equilibrium is reached when the lever momentum of the applied forces in support of said axis is zero. The applied forces here are the pressures acting on the external electrodes which are opposite to each other, and to have equilibrium they must be alike. When the sound waves strike on the disk or diaphragm 75 the plate 95 vibrates; the central electrodes 88 and 89 are also vibrated with the plate 95 and the current will oscillate between the two micro-phones. The vibrations of the central electrode will be much easier for the reason that the micro-phone is not acting with any initial force on the plate 95 which would be the case were it not for the fact that the system is rotatable around the axis 114. The union 99 (Fig. 16) of the stem 98, which is connected to the disk 75, causes the vibratory movement of the plate 95 to be increased at the point on which the central electrode of the differential micro-phone is fixed. In the vibrations of the central electrode the pressure of the granular carbon being very slight, and the mass of the whole system being relatively large in comparison to the central vibrating part, this central vibrating part may be considered as freely vibrating between two immovable parts. To better maintain this immobility of the external electrodes the springs 118 and 119 are provided. By closing the springs 118 and 119 (Fig. 12) so that they cannot leave the position of greatest sensibility the transmitter may be employed in any position like the usual transmitter in universal use.

(Referring to the construction shown in Figs. 9, 10 and 11.) The sound waves striking the disk 75 easily displaces said disk, while this displacement is increased on account of the compression on the inside of the concaved ring or collar 76 because the compression from the inside of said ring or collar tends to extend the surface of the collar, so as to increase the effect of the compression. On account of the felt disk 80 arranged behind the disk 75 all sound waves striking against the disk are absorbed.

In the modification shown in Figs. 14 and 15 the reciprocal position between the tangential planes of the carbon and the sphere will not be altered, and if the arms 86 and 87 are made of aluminum the whole mass of the micro-phone becomes so light that it can oscillate around its axis 114 harmonically with the oscillations of the plate 95. When in the construction the line of the contacts passes through the center of oscillation as compared to the rotation axis no force acting between the sphere and the carbon plates can be transmitted to the supports 112 and 113 of the axis; consequently the greatest sensibility and exactness is obtained, the whole system being free of any vibrations from the said supports. In this combination the entire micro-phone vibrates following the central plate 95 without any self vibration, because no elastic force on the supporting points will be excited in the micro-phone and the variations of velocity which the micro-phone undergoes by these undulations produces differential variations of pressure in the contact points from which the micro-phonic effect becomes very efficient. In order to regulate the initial pressure of the two small plates 127 and 128 on the sphere 129 the screw 131 is provided, and to avoid all danger of any occasional parting of any of the parts which might cause telephonic troubles I can provide a bolt 130 as shown in Fig. 15 which absolutely maintains the correct distance between the arms 86 and 87. This bolt or stem is made of steel and insulated electrically from the arms.

Having thus fully described my invention what I claim as new and desire to secure by Letters Patent of the United States, is;

1. A transmitter comprising a differential micro-phone comprising two separate micro-phones, each of said separate micro-phones comprising two electrodes arranged in a casing of insulating material, and a layer of carbon dust arranged between each of said electrodes, one electrode of each micro-phone being solidly connected with one electrode of the other micro-phone constituting a central electrode, a plate connected to said central electrode, a support connected to the other electrode of each of said micro-phones, said support being formed of two arms electrically separate and mechanically connected to an axis external to the micro-phone, and bearings for the same to permit free oscillations, the whole arranged in such manner as to allow self adjustment of the external electrodes with respect to the central one.

2. A transmitter comprising a differential micro-phone comprising three electrodes, a plate carrying the central electrode to which plate said central electrode is mechanically connected, the two other electrodes being provided with a hard smooth surface, a support carrying each of said last mentioned electrodes, said support comprising two parts electrically separate and mechanically connected to an axis external to the micro-phone, and bearings for the same to permit it to turn, to allow automatic adjustment of the said two other electrodes with respect to the central one.

3. A transmitter comprising three electrodes, a plate carrying the central electrode of the three, an axis external to the microphone to which the two external electrodes are rigidly connected, and means for allowing said axis to turn on its bearings, to effect self adjustment of the two external electrodes with respect to the central one.

4. A transmitter comprising a differential micro-phone having three electrodes, a plate carrying the central electrode of the three, and means for holding the other two electrodes in such manner as to allow them self adjustment with respect to the central electrode by turning said holding means.

5. A transmitter comprising three electrodes, a diaphragm adapted to vibrate under the influence of the sound waves, means for mechanically connecting said diaphragm with the central electrode of the said three electrodes, and means for holding the other two electrodes in such manner as to permit them to turn around an axis external to the micro-phone, to allow self adjustment with respect to the central electrode.

6. A transmitter comprising a differential micro-phone having three electrodes, a diaphragm adapted to vibrate under the influence of the sound waves, a flange or collar on said diaphragm, the exterior surface of said flange or collar being concaved, means for mechanically connecting said diaphragm with the central electrode of the said three electrodes, and means for holding the other two electrodes in such manner as to permit them to turn on an axis external to the micro-phone.

7. A transmitter comprising a differential micro-phone having three electrodes, a plate carrying the central electrode of the three, means for holding the other two electrodes in such manner as to permit them to turn around an axis external to the micro-phone, a diaphragm, and a disk of soft material distinct and separate from the vibrating parts and interposed between said diaphragm and said micro-phone as an acoustic wall.

8. A transmitter comprising a differential micro-phone having three electrodes, a diaphragm mechanically connected to the central electrode of the three, a support for the other two electrodes, an axis for the two outer electrodes external to the micro-phone, said support mechanically connecting the two outer electrodes with said axis, bearings for said axis, said axis being permitted to turn on its bearings, and means on said support for regulating the pressure in the micro-phone.

9. A transmitter comprising a differential micro-phone having three electrodes, a diaphragm mechanically connected to the central electrode of the three, a support for the other two, an axis for the other two electrodes external to the micro-phone, said support mechanically connecting the other two electrodes to said axis, bearings upon which said axis is permitted to turn to allow self adjustment of the external electrodes with respect to the central one, and means acting on said support and the electrodes carried thereby for maintaining said support and its electrodes in the position of greatest efficiency and for avoiding further rotation around said axis.

In testimony whereof I affix my signature, in presence of two witnesses.

PIETRO STRAGIOTTI.

Witnesses:
C. M. FORREST,
C. HUGH DUFFY